United States Patent [19]

Waddill et al.

[11] Patent Number: 4,518,749

[45] Date of Patent: May 21, 1985

[54] EPOXY RESIN CURATIVES

[75] Inventors: Harold G. Waddill; Heinz Schulze, both of Austin, Tex.

[73] Assignee: Texaco Inc., White Plains, N.Y.

[21] Appl. No.: 549,028

[22] Filed: Nov. 7, 1983

[51] Int. Cl.³ ............................................. C08G 59/42
[52] U.S. Cl. .................................... 525/504; 528/111; 528/114; 528/361; 528/363; 528/365
[58] Field of Search ............... 528/111, 114, 361, 365, 528/363; 525/504

[56] References Cited

U.S. PATENT DOCUMENTS

| 4,113,697 | 9/1978 | Schulze et al. | 528/94 |
| 4,115,360 | 9/1978 | Schulze et al. | 528/94 |
| 4,115,361 | 9/1978 | Schulze et al. | 528/111 |
| 4,147,857 | 4/1979 | Waddill et al. | 528/94 |
| 4,169,177 | 9/1979 | Waddill et al. | 528/112 |
| 4,304,889 | 12/1981 | Waddill et al. | 528/111 X |

Primary Examiner—Earl A. Nielsen
Attorney, Agent, or Firm—Jack H. Park; Kenneth R. Priem; Richard A. Morgan

[57] ABSTRACT

An epoxy resin composition is disclosed. The composition comprises a polyepoxide and a curing amount of a bis(hydrogen maleate) derivative of a polyoxypropylenediamine. This composition when cured produces unexpectedly superior encapsulations which are more flexible and less brittle than those of the prior art.

13 Claims, No Drawings

EPOXY RESIN CURATIVES

BACKGROUND OF THE INVENTION

Field of the Invention

This invention relates to curable epoxy resins. More particularly it relates to novel curing agents.

Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents is, the anhydrides. Another is the carboxylic acids. It is known however that anhydrides and carboxylic acids form encapsulations which are brittle and fail when subjected to thermal cycling. Also these curing agents produce resins with poor curing qualities. There is a need in the art for an epoxy curative that produces cured resins which display flexibility and resistance to thermal cycling superior to that found in resins cured with anhydrides and carboxylic acids.

U.S. Pat. No. 4,304,889 discusses the use of bis(hydrogen maleates) of polyoxyalkylene polyamines as an accelerator for curing a base resin with a difficult to cure aromatic polyamine.

Accelerators are compounds added in minor amounts to epoxy resin formulations to enhance the cure. They enhance the cure by reducing curing temperature, reducing curing times or driving curing to completion. Accelerators are added to the resin mixture in minor amounts and have no effect on the properties of the cured epoxy resin.

SUMMARY OF THE INVENTION

The present invention is an epoxy resin composition comprising a base resin and a curing amount of a curing agent. The base resin is a vicinal polyepoxide having an average of at least 1.8 reactive 1,2-epoxy groups per molecule. The curing agent is a bis(hydrogen maleate) derivative of a polyoxypropylenediamine.

DETAILED DESCRIPTION OF THE INVENTION

According to the present inventive concept, a vicinal polyepoxide and a curing amount of a bis(hydrogen maleate) of a polyoxypropylenediamine are thoroughly admixed and cured in accordance with conventional methods to provide cured epoxy resins having unexpectedly superior properties.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethyl-methane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenyl-methane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The novel epoxy curing agents of the present invention are a bis(hydrogen maleate) derivative of a polyoxypropylenediamine.

These curing agents are of the general formula:

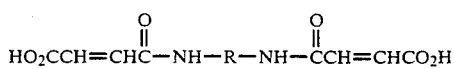

wherein: C is carbon, N is nitrogen, H is hydrogen, O is oxygen and R is the radical:

$$-CH(CH_3)CH_2[OCH_2CH(CH_3)]_x-$$

wherein x is an integer averaging from 2 to 35, preferably 2 to 6.

These radicals have an average molecular weight of from 200 to 2100 and preferably from 200 to 500. Two members of this group are those wherein the radical x average 2.6 and x averages 5.6.

This curing agent is synthesized by condensing two moles of maleic anhydride with one mole of the polyoxypropylene diamine. The maleic anhydride is heated in a suitable solvating agent, such as toluene or benzene. Heating at 50° C. to 60° C. produces a clear, colorless solution. The polyoxypropylene diamine is added to this solution and maintained at this temperature for about 1 to 3 hours and a light brown solution results. This solution is first stripped with an aspirator and then under high vacuum (90° C. to 95° C. @ 10 to 15 mm Hg).

High temperature during addition of amine must be avoided. High temperature may cause amine addition to the maleic anhydride double bond. High vacuum stripping is necessary to remove all solvent. At temperatures greater than 94° C., maleic anhydride may be lost and side reactions can occur. Additional syntheses are shown in U.S. Pat. No. 4,304,889 incorporated herein in entirety by reference.

The curing agents are admixed with the polyepoxide composition in an amount according to the equivalent weight of the curing agents employed. Generally the number of equivalents of acid groups is from about 0.6 to about 1.2 times the number of epoxide equivalents present in the curable epoxy resin composition, with a nearly stoichiometric amount being preferred. The exact amount of constituents in accordance with the above general requirements will depend primarily on the application for which the cured resin is intended.

Finally, in curing the epoxy resin, the reactants are simply admixed in correct equivalent ratios in a suitable reaction vessel and heated, if necessary, until the reaction occurs. If the ultimate in physical properties is required of the system, an additional cure at elevated temperature (100° C. to 150° C.) for a short period of time ($\frac{1}{2}$ to 4 hours is desirable).

Curing of the vicinal polyepoxide may be effected with bis(hydrogen maleate) derivatives alone or with combinations of carboxylic acids or anhydrides known for their properties in curing an epoxy resin. It is found that bis(hydrogen maleate) derivative to anhydride or carboxylic acid weight ratios of about 5:1 to 1:5 produce cured epoxy resins with significantly improved properties. When mixed with anhydrides or carboxylic acids, the bis(hydrogen maleate) derivative promotes increased flexibility, impact strength, elongation and thermal shock resistance.

A brief list of anhydrides for this application is succinic anhydride; phthalic anhydride; maleic anhydride; methyl-4-endomethylene tetrahydrophthalic anhydride; hexahydrophthalic anhydride; tetrahydrophthalic anhydride dodecenyl succinic anhydride and the Diels-Alder adduct of maleic anhydride and a substituted cyclopentadiene. The use of methyl-bicyclo[2.2.1-]heptene-2,3-dicarboxylic anhydride is shown in the Example.

The carboxylic acids which may be used are any of the carboxylic acids known in the art for curing epoxy resins. These are, for example: succinic, glutaric, adipic, pimelic, suberic, azelaic and sebacic, oxalic, phthalic, p-aminobenzoic, maleic, aconitic and chlorendic acids; carboxyl terminated polyester resins and polymeric dimer and trimer fatty acids.

The invention is also a method for forming an epoxy resin. The method comprises contacting a polyepoxide with a curing amount of a curing agent; the improvement comprising using a curing agent represented by the formula:

$$HO_2CCH=CHC\overset{O}{\overset{\|}{-}}NH-R-NH-\overset{O}{\overset{\|}{C}}CH=CHCO_2H$$

wherein: C is carbon, N is nitrogen, H is hydrogen, O is oxygen and R is the radical:

$$-CH(CH_3)CH_2[OCH_2CH(CH_3)]_x-$$

wherein: x is an integer averaging from 2 to 35, preferably 2 to 6.

When the curing agent is used alone, it is incorporated into the uncured polyepoxide resin by admixing. When an additional curing agent is used, such as anhydrides and carboxylic acids, the curing agent of the present invention is first admixed with the polyepoxide prior to addition of these curatives. The constituents forming the curable material are then intimately admixed by standard methods and degassed in the presence of a commercial defoamer and minute amounts of silicone oils to prevent voids and bubbles.

A major problem when casting articles from epoxy resin formulations cured with anhydrides is that they are quite brittle and fracture easily on rapid application of stress. In particular, thermal cycling rapidly from high to low temperatures often results in cracking of anhydride cured epoxy encapsulations. The composition and process of the present invention result in flexible castings that are less brittle with increased resistance to thermal shock than formulations cured with anhydrides or carboxylic acids.

The cured resin properties are improved by the presence of polyoxyalkylene-α, ω-bis(hydrogen maleates) as distinguished from U.S. Pat. No. 4,304,889 wherein bis(hydrogen maleates) are used as accelerators and do not influence the properties of the cured epoxy resins.

Additionally, conventional pigments; dyes; fillers; flame retarding agents and the like which are compatible; natural or synthetic resins can be added. Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used. The compositions of the instant invention can be used as impregnants, surface coatings, pottings, capsulating compositions, laminants, and as adhesives for bonding metallic elements or structures permanently together.

Enhanced properties of the cured resins is better shown by way of example.

EXAMPLE 1

| Formulation | Moles | Molecular Wgt. | Charge |
|---|---|---|---|
| Reactants: | | | |
| Maleic anhydride | 3.09 | 98 | 303 grams |
| JEFFAMINE ® D-400[1] | 1.5 | 427 | 604.5 grams |
| Solvent: | | | |
| Benzene | | | 500 ml. |

[1]JEFFAMINE ® D-400 is a polyoxypropylene diamine of average molecular weight 400 having the general formula: $H_2NCH(CH_3)CH_2[OCH_2CH(CH_3)]_xNH_2$ wherein x average 5.6.

Preparation

The 303 grams of maleic anhydride was added to 500 ml. of benzene and heated to 56° C. to form a clear, colorless solution. D-400 was added over 1¾ hours with occasional cooling to maintain a temperature of 50° C. to 60° C. The reaction mixture was next vacuum stripped at a pot temperature of 90° C. to 94° C. at 0.2 mm Hg to yield 932 grams of product.

Product analysis was 3.29 meq/g (3.2 meq/g theoretical) and a total of 0.26 meq/g amine.

EXAMPLE 2

| Formulation | Moles | Molecular Wgt. | Charge |
|---|---|---|---|
| Reactants: | | | |
| Maleic anhydride | 8.2 | 98 | 804 grams |
| JEFFAMINE ® D-230[2] | 4.0 | 235.0 | 940 grams |
| Solvent: | | | |
| Benzene | | | 1000 ml. |

[2]JEFFAMINE ® D-230 is a polyoxypropylene diamine of average molecular weight 230 having the general formula: $H_2NCH(CH_3)CH_2[OCH_2CH(CH_3)]_xNH_2$ wherein x average 2.6.

The 804 grams of maleic anhydride was dissolved in benzene at 55° C. JEFFAMINE ® D-230 was added over 2⅓ hours with occasional cooling to maintain temperature at less than 55° C. The product was vacuum stripped at 95° C. and 0.5 mm Hg to remove solvent. The yield was 1729 grams of a solid, glass-like material.

EXAMPLE 3
Properties of Cured Epoxy Resins

| Formulation | parts by weight | | | | |
|---|---|---|---|---|---|
| | 1 | 2 | 3 | 4 | 5 |
| Epoxy Resin (EEW 188) | 100 | 100 | 100 | 100 | 100 |
| A | 80 | — | — | — | — |
| B | — | 80 | — | — | — |
| C | — | — | 90 | — | — |
| D | — | — | — | 85 | — |
| E | — | — | — | — | 40 |
| Properties of Cured ⅛-in. Castings:[3] | | | | | |
| Izod impact strength, ft-lbs/in | 0.38 | 0.62 | 0.64 | 0.56 | 0.94 |
| Tensile strength, psi | 7250 | 7300 | 9350 | 10600 | 8850 |
| Tensile modulus, psi | 452000 | 450000 | 454000 | 469000 | 416000 |
| Elongation at break, % | 1.8 | 2.8 | 2.2 | 5.5 | 7.4 |
| Flexural strength, psi | 16000 | 18700 | 17800 | 17900 | 15200 |
| Flexural modulus, psi | 421000 | 456000 | 437500 | 478000 | 423000 |
| HDT, °C., 264 psi/66 psi | 140/145 | 119/124 | 1065/112 | 72/76 | 68/73.5 |
| Shore D hardness, 0-10 sec. | 90-89 | 89-88 | 89-87 | 82-79 | 82-80 |

[3]Cured 3 hours at 110° C., 3 hours at 160° C.
A. Anhydride:Accelerator (97:3 parts by weight)
Anhydride (NMA) - 1-methyl-3,6-endomethylene-4-cyclohexene-1,2-dicarboxylic anhydride
Accelerator - tris(dimethylaminomethyl)phenol (DMP 30)
B. D400 BHM:NMA:DMP30 (10:87:3 parts by weight)
D400 BHM - bis(hydrogen maleate) of JEFFAMINE ® D-400
NMA - Anhydride
DMP30 - Accelerator
C. D400 BHM:NMA:DMP30 (20:77:3 parts by weight)
D. D400 BHM:NMA:DMP30 (48.5:48.5:3 parts by weight)
E. D400 BHM:DMP30 (97:3 parts by weight)
Elongation at Break (%) ASTM test D-638;
Tensile strength (psi) ASTM test D-638;
Tensile Modulus (psi) ASTM test D-638;
Flexural Strength (psi) ASTM test D-790;
Flexural Modulus (psi) ASTM test D-790;
Shore D-Hardness 0-10 seconds ASTM test D-2240;
HDT (°C., 264 psi/66 psi) ASTM test D-648;
Izod Impact Strength (ft lbs/in) ASTM test D-256;

EXAMPLE 4
Thermal Shock Testing

| Formulation | (parts by weight) | | |
|---|---|---|---|
| | 6 | 7 | 8 |
| JEFFAMINE ® D-400 bis(hydrogen maleate) | 0 | 20 | 48.5 |
| NADIC ® methyl anhydride[4] | 97 | 77 | 48.5 |
| DMP-30 | 3 | 3 | 3 |

| For-mula | Curative Conc., phr. | Thermal Shock cycling - no. of samples cracked after cycle number | | | | | | | | | | Total |
|---|---|---|---|---|---|---|---|---|---|---|---|---|
| | | 1 | 2 | 3 | 4 | 5 | 6 | 7 | 8 | 9 | 10 | |
| 6 | 80 | 6 | 2 | 1 | 0 | 0 | 0 | 0 | 0 | 0 | 0 | 9 |
| 7 | 90 | 0 | 0 | 0 | 0 | 0 | 0 | 0 | 0 | 1 | 0 | 1 |

| 8 | 85 | 0 | 0 | 0 | 0 | 0 | 0 | 0 | 0 | 0 | 0 |

Thermal cycle: ½hr. @ 120° C., ¼ hr. @ −20° C., ¼ hr @ 25° C.
Samples recycled if not cracked.
(4) 1-methyl-3,6-endomethylene-4-cyclohexene-1,2-dicarboxylic anhydride The principle of the invention and the best mode contemplated for applying that principle have been described. It is to be understood that the foregoing is illustrative only and that other means and techniques can be employed without departing from the true scope of the invention defined in the following claims.

What is claimed is:

1. An epoxy resin composition comprising:
    (A) a vicinal polyepoxide having an average of at least 1.8 reactive 1,2-epoxy groups per molecule and
    (B) a curing amount of the curing agent:

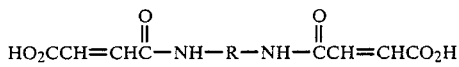

wherein C is carbon, N is nitrogen, H is hydrogen, O is oxygen and R is the radical $-CH(CH_3)CH_2[OCH_2CH(CH_3)]_x-$ wherein x is an integer of from 2 to 35, and
    (C) anhydride in a weight ratio of curing agent to anhydride of 1:5 to 5:1.

2. The composition of claim 1 wherein R has a molecular weight of from 200 to 2100.

3. The composition of claim 1 wherein R has a molecular weight of from 200 to 500.

4. The composition of claim 1 wherein x averages from 2 to 6.

5. The composition of claim 1 wherein x averages 5.6.

6. The composition of claim 1 wherein x averages 2.6.

7. An epoxy resin composition comprising:
    (A) a vicinal polyepoxide having an average of at least 1.8 reactive 1,2-epoxy groups per molecule and
    (B) a curing amount of the curing agent:

wherein C is carbon, N is nitrogen, H is hydrogen, O is oxygen and R is the radical $-CH(CH_3)CH_2[OCH_2CH(CH_3)]_x-$ wherein x is an integer of from 2 to 35, and
    (C) carboxylic acid in a weight ratio of curing agent to carboxylic acid of 1:5 to 5:1.

8. The composition of claim 7 wherein R has a molecular weight of from 200 to 2100.

9. The composition of claim 7 wherein R has a molecular weight of from 200 to 500.

10. The composition of claim 7 wherein x averages from 2 to 6.

11. The composition of claim 7 wherein x averages 5.6.

12. The composition of claim 7 wherein x averages 2.6.

13. The composition of claim 7 wherein the anhydride is 1-methyl-3,6-endomethylene-4-cyclohexene-1,2-dicarboxylic anhydride.

* * * * *